United States Patent [19]

Gabriel

[11] 4,081,218
[45] Mar. 28, 1978

[54] TRANSMISSION EXTENSION OIL SEAL

[75] Inventor: Martin G. Gabriel, Birmingham, Mich.

[73] Assignee: Ford Motor Company, Dearborn, Mich.

[21] Appl. No.: 779,875

[22] Filed: Mar. 21, 1977

[51] Int. Cl.² ............................................. F16d 1/00
[52] U.S. Cl. ...................................... 403/24; 403/288; 403/359; 29/235; 277/9; 277/58; 277/208
[58] Field of Search ......................... 403/288, 359, 24; 277/9, 9.5, 1, 58, 207 R, 208, 237 R; 29/235

[56] References Cited

U.S. PATENT DOCUMENTS

| 3,016,722 | 1/1962 | Batdorf | 277/208 X |
| 3,378,111 | 4/1968 | Greer et al. | 192/109 F X |
| 3,385,059 | 5/1968 | Leonard et al. | 417/273 X |
| 3,447,819 | 6/1969 | Borsum et al. | 277/9 X |
| 3,778,881 | 12/1973 | Knapp | 277/9 X |
| 3,947,944 | 4/1976 | Washington | 277/9.5 X |

FOREIGN PATENT DOCUMENTS

| 204,524 | 11/1956 | Australia | 403/359 |
| 1,190,165 | 4/1970 | United Kingdom | 403/359 |

Primary Examiner—Robert S. Ward
Attorney, Agent, or Firm—Donald J. Harrington; Keith L. Zerschling

[57] ABSTRACT

An oil seal for an automotive power transmission mechanism adapted to seal a transmission output shaft within the transmission housing so that automatic transmission fluid within the housing is retained during storage and during shipping of the transmission prior to its assembly within an automotive vehicle driveline and transmission lubricant within the transmission housing is retained after it is assembled in the driveline following insertion of the transmission driveshaft yoke on the output shaft.

6 Claims, 4 Drawing Figures

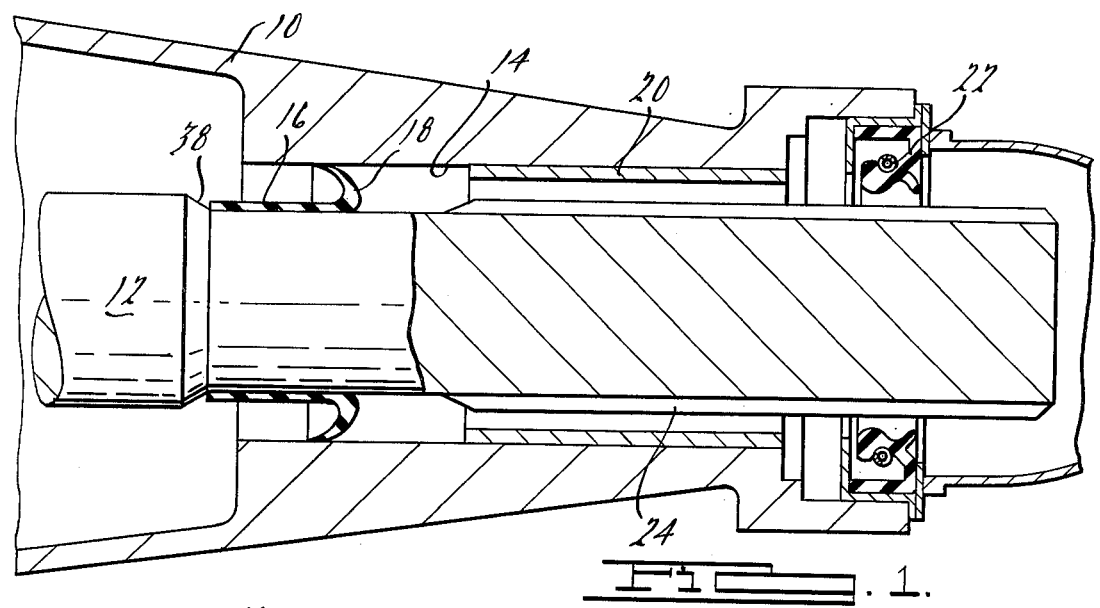
FIG. 1.
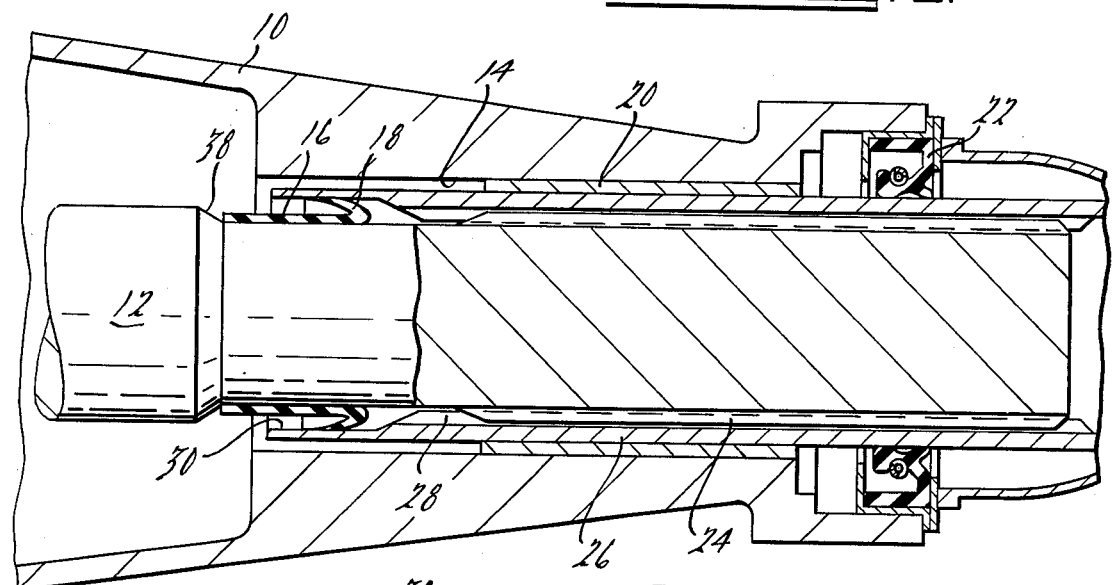
FIG. 1A.
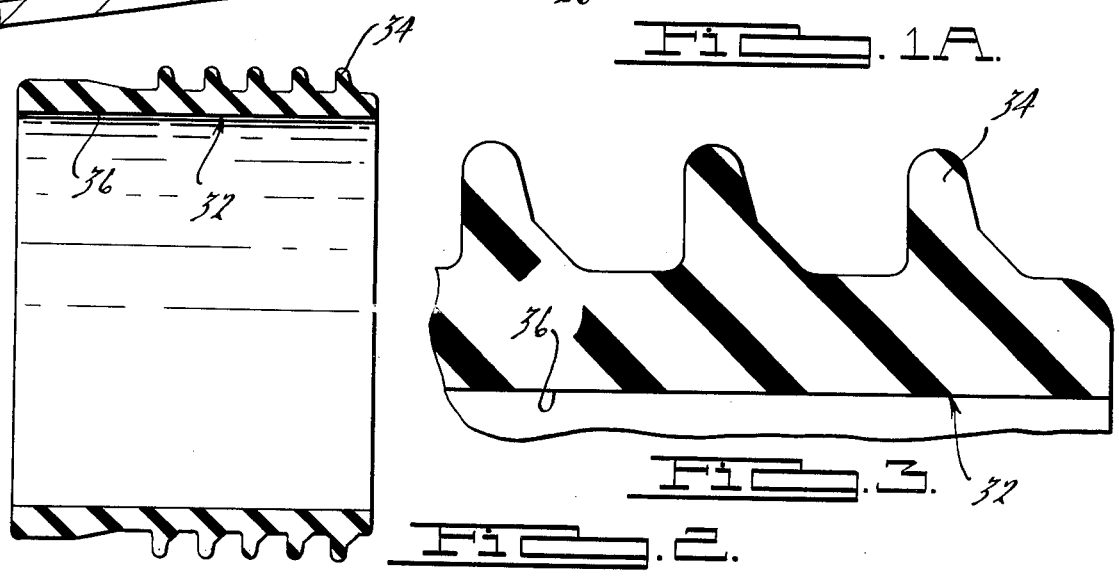
FIG. 2.
FIG. 3.

TRANSMISSION EXTENSION OIL SEAL

BRIEF DESCRIPTION OF THE INVENTION

My invention relates generally to automotive transmissions which comprise multiple ratio gearing within a main transmission housing and an extension housing that surrounds a transmission output shaft or tailshaft. A slip yoke is splined to the output shaft to effect a driving connection between the vehicle drive shaft and the transmission output shaft. This yoke is part of the universal joint that transfers torque from the transmission output shaft to the drive shaft while accommodating relative angular displacement of the drive shaft with respect to the output shaft. A fluid seal normally is provided in installations of this kind in the vicinity of the slip yoke to prevent leakage of fluid from the interior of the transmission.

The end of the tailshaft housing is sealed in conventional arrangements with a closure cap during storage of the transmission and during shipment prior to assembly within a driveline. During assembly in the driveline the cap must be removed and the slip yoke must be inserted. Oil spill commonly occurs during this assembly procedure thereby creating a housekeeping problem, and in some instances the oil level in the transmission is thereby lowered to a level that may be below an acceptable limit to maintain proper lubrication.

The use of caps on the ends of the tailshaft extension housings during storage also presents a recurring problem because the caps frequently pop out of place, thereby causing oil spillage on the warehouse floor or on the freight car floor.

The improved seal assembly of my invention eliminates these problems associated with the storage and shipping of transmissions and with the assembly of oil seal and slip yoke assemblies within the transmission mechanism. My invention comprises a special flexible oil seal that is stretched over the tailshaft thereby creating a sealing contact over the inside diameter of the extension housing. When the transmission is installed in the vehicle, the universal joint slip yoke pulls the seal inwardly as it is inserted into the opening of the tailshaft extension housing. The seal retains the special lubricant usually located in the spline area of the slip yoke assembly to eliminate spline lock problems and to prevent unacceptable spline wear and spline "grunt" noises. A conventional lip seal inserted at the outermost extremity of the extension housing engages and seals the outer surface of the universal joint slip yoke.

BRIEF DESCRIPTION OF THE FIGURES OF THE DRAWINGS

FIG. 1 is a portional cross-sectional view of a part of a transmission assembly, particularly the tailshaft extension housing and the output shaft arrangement.

FIG. 1A shows the assembly illustrated in FIG. 1 together with a slip yoke having an internal spline that is arranged in registry with an external spline formed on the output shaft of FIG. 1.

FIG. 2 is a cross-sectional view of a flexible seal element used in assemblies such as that shown in FIG. 1.

FIG. 3 is an enlargement of a portion of the lip seal shown in FIG. 2.

PARTICULAR DESCRIPTION OF THE INVENTION

For purposes of understanding my invention, reference may be made to U.S. Pat. Nos. 3,378,111 and 3,385,059, each of which discloses a transmission mechanism for use in an automotive vehicle. Each shows a transmission housing with a tailshaft extension together with an output shaft inserted within the extension.

In FIG. 1 the transmission housing tailshaft extension is identified by reference character 10. It is bolted or otherwise secured to the main transmission housing as indicated in the previously mentioned reference patents. An output shaft 12 extends through a circular opening 14 in the housing 10. A flexible seal is stretched over the output shaft 12 as shown at 16. The right-hand margin of the seal 16 is formed with a lip 18 which registers with the inner cylindrical surface 14 of the housing 10. The base portion of the seal 16 is in sealing engagement with the surface of the shaft 12.

A bushing 20 is received within the opening 14. The outermost extremity of the opening 14 is adapted to receive a lip seal assembly 22.

Shaft 12 is provided with an external spline portion 24. A drive shaft slip yoke, shown in FIG. 1A at 26, is provided with a central cylindrical opening having internal spline teeth 28 which register with the external spline teeth of the spline portion 24 of the shaft 12. The yoke 26 is inserted within the opening 14 to effect a driving engagement with the output shaft 12. In doing so the seal 22 is brought into sealing engagement with the outer cylindrical surface of the yoke 26 and the inner end of the yoke 26 folds the lip 18 downwardly thereby effecting sealing contact with cylindrical surface 30 formed inside the yoke 26. No leakage of fluid occurs during assembly because the lip 18 maintains the lubricant within the transmission housing both before and after assembly of the yoke 26. In addition, special fluid or lubricant for the spline 24 which prevents undesirable driveline noises due to slippage of the internal and external spline teeth relative to each other when the transmission is driving under torque, is retained by the inner seal. Seal 22, as seen in FIG. 1A, registers with the external surface of the spline yoke 26 to prevent leakage of fluid from the interior of the transmission across the bushing 20. It also prevents dirt form entering the interior of the tailshaft housing. The bushing 20 supports the yoke, which in turn supports the output shaft following assembly of the yoke.

FIGS. 2 and 3 show an alternate transmission seal that may be used in the assembly of FIG. 1 in place of the seal 16. It comprises a cylindrical element 32 with external lip seal elements 34 that are adapted to engage the interior of the transmission extension housing wall 14. The interior cylindrical surface 36 of the seal 32 sealingly engages the outer surface of the shaft 12. Seal 32 would be positioned within the assembly of FIG. 1 approximately as shown in FIG. 1 of the shoulder 38.

The seal assembly of this invention serves the purposes of both a shipping seal and an "anti-grunt" spline seal. It also maintains a desirable separation between the extreme pressure spline lubricant and the automatic transmission fluid. This makes it possible to use the most desirable spline yoke lubricant while at the same time making it possible to use the proper transmission lubricant fluid. This combined spline seal and shipping seal assembly will maintain a zero aid leak condition up to 8psi internal transmission pressure. Proper sealing integrity is maintained for up to 90 days at temperatures as high as 150° fahrenheit.

Having described preferred forms of my invention, what I claim and desire to secure by U.S. Letters Patent is:

1. A combined shipping seal and drive shaft yoke seal assembly for a transmission having a main housing and an extension housing, an output shaft located in the extension housing, a seal surrounding the output shaft, the output shaft extending through a circular opening in the extension housing, said seal being arranged in sealing engagement with the surface of the shaft and having at least one circular seal lip thereon, the margin of said seal lip engaging the inner surface of said opening in the extension housing whereby fluid within the main transmission housing is sealed within the main housing thus preventing leakage of fluid through the extension housing opening, said output shaft having an external spline portion, a slip yoke forming a part of the universal joint and having an internally splined opening, the slip yoke being adapted to be inserted within the opening with its spline teeth and registering with the external splines of the output shaft, the innermost end of the yoke being adapted to engage the seal lip of said seal thereby pushing said seal lip away from engagement with the wall of said opening and effecting sealing contact with the interior of the yoke.

2. A combined shipping seal and drive shaft yoke seal assembly for a transmission having a main housing and an extension housing, an output shaft located in the extension housing, an inner seal surrounding the output shaft, the output shaft extending through a circular opening in the extension housing, said inner seal being arranged in sealing engagement with the surface of the shaft and having at least one circular seal lip thereon, the margin of said seal lip engaging the inner surface of said opening in the extension housing, whereby fluid within the main transmission housing is sealed within the main housing thus preventing leakage of fluid through the extension housing opening, said output shaft having an external spline portion, a slip yoke forming a part of the universal joint and having an internally splined opening, the slip yoke being adapted to be inserted within the opening with its spline teeth and registering with the external splines of the output shaft, the innermost end of the yoke being adapted to engage the seal lip of said inner seal thereby pushing said seal lip away from enagement with the wall of said opening and effecting sealing contact with the interior of the yoke, a second annular seal located near the outermost end of the extension housing in sealing engagement with the outer surface of said yoke thereby preventing leakage of fluid from the main housing, said inner seal maintaining an effective separation of the fluid within the housing from lubricant in the region of the engaged spline teeth of the output shaft in the yoke.

3. The combination as set forth in claim 1 wherein the transmission includes a bearing located inside the extension housing opening surrounding said output shaft and adapted to support said output shaft within said extension housing to accommodate radial loads on the output shaft.

4. The combination as set forth in claim 2 wherein the transmission includes a bearing located inside the extension housing opening surrounding said output shaft and adapted to support said output shaft within said extension housing to accommodate radial loads on the output shaft.

5. The combination as set forth in claim 1 wherein said seal comprises a series of real lips adapted to engage the inner surface of the opening in the extension housing, said seal lips being arranged in close proximity and adapted to be displaced by said yoke away from said inner surface when the latter is assembled over the output shaft.

6. The combination as set forth in claim 2 wherein said inner seal comprises a series of real lips adapted to engage the inner surface of the opening in the extension housing, said seal lips being arranged in close proximity and adapted to be displaced by said yoke away from said inner surface when the latter is assembled over the output shaft.

* * * * *